(12) United States Patent
Albright et al.

(10) Patent No.: US 8,034,268 B2
(45) Date of Patent: Oct. 11, 2011

(54) METHOD FOR MANUFACTURING LIGHTWEIGHT COMPOSITE FAIRING BAR

(75) Inventors: Dennis L. Albright, Douglass, KS (US); David W. Hackler, Wichita, KS (US); Randall R. Clark, Wichita, KS (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/051,596

(22) Filed: Jul. 29, 2008

(65) Prior Publication Data
US 2008/0314516 A1   Dec. 25, 2008

Related U.S. Application Data

(62) Division of application No. 11/160,192, filed on Jun. 13, 2005, now Pat. No. 7,416,401.

(51) Int. Cl.
*B29C 44/12* (2006.01)
*B32B 3/12* (2006.01)

(52) U.S. Cl. ........ 264/46.5; 246/45.1; 246/46.4; 246/46.6; 246/46.8; 246/510; 156/242; 156/245; 156/285; 156/381; 156/79

(58) Field of Classification Search ............ 264/45.1, 264/45.3, 46.4, 46.8, 46.5, 46.6, 257, 258, 264/510; 156/285, 381, 382, 383, 391, 77, 156/78, 79, 213, 242, 243, 245, 307.1
See application file for complete search history.

(56) References Cited

U.S. PATENT DOCUMENTS

| | | | |
|---|---|---|---|
| 3,439,732 A * | 4/1969 | Mario | 164/112 |
| 3,479,779 A | 11/1969 | Ziegler | |
| 3,549,449 A | 12/1970 | Windecker | |
| 3,598,275 A | 8/1971 | Francois | |
| 3,635,482 A | 1/1972 | Holman | |
| 3,879,245 A * | 4/1975 | Fetherston et al. | 156/245 |
| 3,928,106 A * | 12/1975 | Molnar | 156/210 |
| 3,949,988 A * | 4/1976 | Staufer | 473/536 |
| 3,958,810 A * | 5/1976 | Bohm | 280/610 |
| 4,025,686 A * | 5/1977 | Zion | 442/373 |
| 4,065,340 A * | 12/1977 | Dickerson | 156/154 |
| 4,093,268 A | 6/1978 | Sampson et al. | |
| 4,250,136 A * | 2/1981 | Rex | 264/257 |
| 4,252,378 A | 2/1981 | DeBolt et al. | |
| 4,261,778 A * | 4/1981 | Albrigtsen et al. | 156/245 |
| 4,313,614 A * | 2/1982 | Woitschatzke et al. | 280/610 |
| 4,382,610 A * | 5/1983 | Arnsteiner | 280/610 |
| 4,397,798 A * | 8/1983 | Parten | 264/46.5 |
| 4,471,020 A * | 9/1984 | McCarthy | 428/309.9 |
| 4,498,686 A * | 2/1985 | Pilpel et al. | 280/610 |
| 4,545,597 A * | 10/1985 | Meatto et al. | 280/610 |
| 4,590,023 A * | 5/1986 | Hayashi et al. | 264/46.5 |
| 4,595,623 A * | 6/1986 | Du Pont et al. | 428/195.1 |
| 4,655,473 A * | 4/1987 | Muller et al. | 280/610 |
| 4,681,725 A * | 7/1987 | Maruyama | 264/46.5 |

(Continued)

*Primary Examiner* — Joseph S. Del Sole
*Assistant Examiner* — Seyed Masoud Malekzadeh
(74) *Attorney, Agent, or Firm* — Ostranger Chong Flaherty & Broitman P.C.

(57) ABSTRACT

A lightweight composite fairing bar (14) for use in fabricating a composite component (16) of an aircraft. The fairing bar (14) includes a core (18) and an elongated outer shell (20) surrounding the core (18). The outer shell (20) is comprised of a laminate material, and the core (18) is comprised of epoxy syntactic foam having a lower density than that of the laminate material. The outer shell (20) is configured for supporting the composite component (16) during the manufacture of the same.

21 Claims, 4 Drawing Sheets

U.S. PATENT DOCUMENTS

| | | | |
|---|---|---|---|
| 4,731,038 A * | 3/1988 | Hancock et al. | 441/68 |
| 4,740,346 A * | 4/1988 | Freeman | 264/258 |
| 4,808,362 A * | 2/1989 | Freeman | 264/257 |
| 4,851,280 A * | 7/1989 | Gupta | 442/292 |
| 4,869,770 A | 9/1989 | Christensen et al. | |
| 4,915,896 A * | 4/1990 | Rachal et al. | 264/511 |
| 5,059,273 A * | 10/1991 | Boyce et al. | 156/307.4 |
| 5,106,568 A * | 4/1992 | Honka | 264/510 |
| 5,116,883 A | 5/1992 | LeMay | |
| 5,152,949 A * | 10/1992 | Leoni et al. | 264/257 |
| 5,173,226 A * | 12/1992 | Cazaillon et al. | 264/46.6 |
| 5,186,777 A * | 2/1993 | Perenon et al. | 156/79 |
| 5,190,094 A * | 3/1993 | Knoess | 164/159 |
| 5,230,844 A * | 7/1993 | Macaire et al. | 264/46.7 |
| 5,273,696 A * | 12/1993 | Cazaillon et al. | 264/45.2 |
| 5,372,370 A * | 12/1994 | Rohrmoser | 280/610 |
| 5,392,514 A | 2/1995 | Cook et al. | |
| 5,421,704 A | 6/1995 | Carletti et al. | |
| 5,443,778 A * | 8/1995 | Schlingman | 264/257 |
| 5,449,425 A * | 9/1995 | Renard et al. | 156/78 |
| 5,501,825 A * | 3/1996 | Jodelet | 264/46.5 |
| 5,549,771 A * | 8/1996 | Brooker | 156/153 |
| 5,593,633 A | 1/1997 | Dull et al. | |
| 5,709,893 A * | 1/1998 | McCarville et al. | 425/389 |
| 5,851,331 A * | 12/1998 | Grenetier et al. | 156/235 |
| 5,897,739 A | 4/1999 | Forster et al. | |
| 5,954,898 A | 9/1999 | McKague et al. | |
| 5,993,184 A | 11/1999 | Morrow | |
| 6,028,565 A | 2/2000 | Mackenzie et al. | |
| 6,291,049 B1 | 9/2001 | Kunkel et al. | |
| 6,403,195 B1 | 6/2002 | Montagna et al. | |
| 6,605,343 B1 | 8/2003 | Motoi et al. | |
| 6,630,093 B1 | 10/2003 | Jones | |
| 6,679,969 B1 * | 1/2004 | Fournier et al. | 156/245 |
| 6,814,563 B2 | 11/2004 | Amnered et al. | |
| 6,861,017 B1 | 3/2005 | McCarville et al. | |
| 7,005,099 B2 * | 2/2006 | Cecchin et al. | 264/258 |
| 7,011,315 B2 | 3/2006 | Czaplicki et al. | |
| 7,097,577 B2 * | 8/2006 | Goldsmith et al. | 473/563 |
| 7,105,120 B2 * | 9/2006 | Skinner et al. | 264/257 |
| 2002/0119269 A1 | 8/2002 | Bardin et al. | |
| 2004/0045396 A1 | 3/2004 | Hosokawa et al. | |
| 2005/0161154 A1 * | 7/2005 | Anderson | 156/278 |
| 2005/0217112 A1 | 10/2005 | Shimizu et al. | |
| 2006/0093791 A1 | 5/2006 | Snell et al. | |
| 2007/0145638 A9 | 6/2007 | Mead | |

* cited by examiner

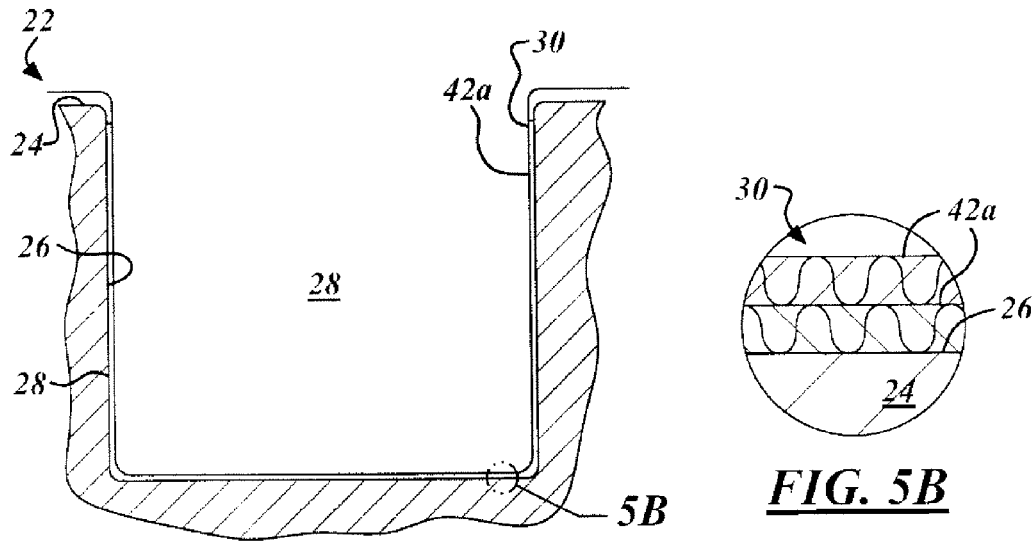
*FIG. 5A*
*FIG. 5B*
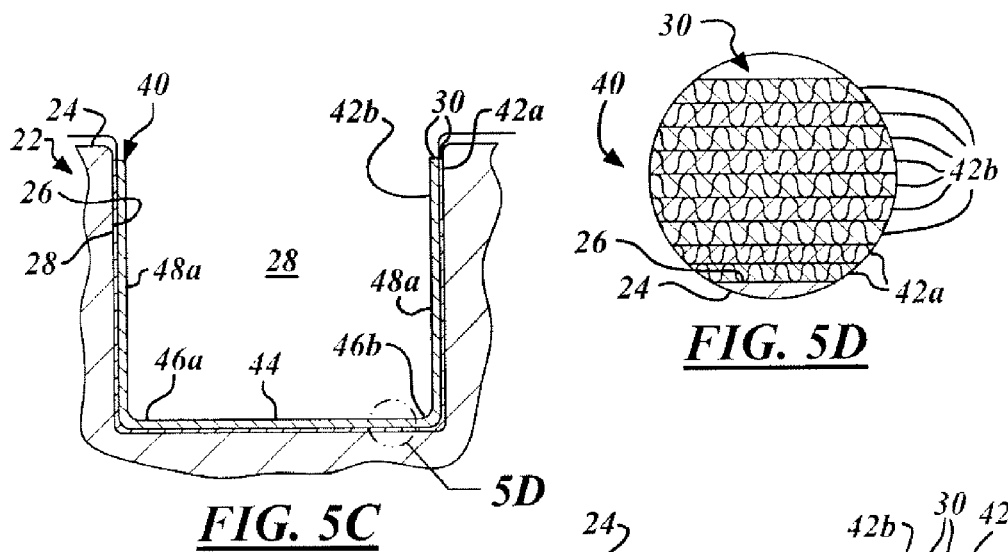
*FIG. 5C*
*FIG. 5D*
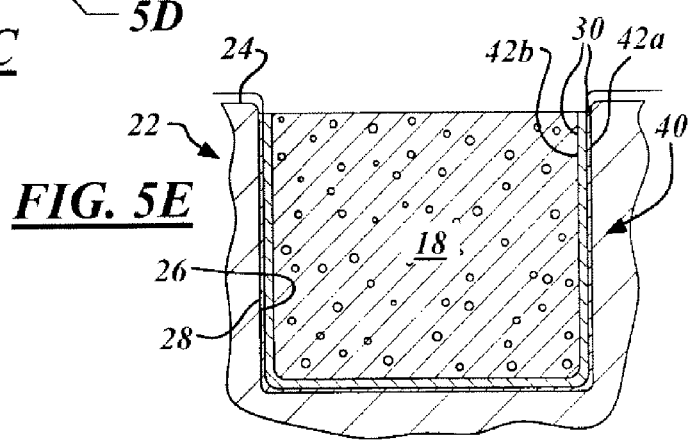
*FIG. 5E*

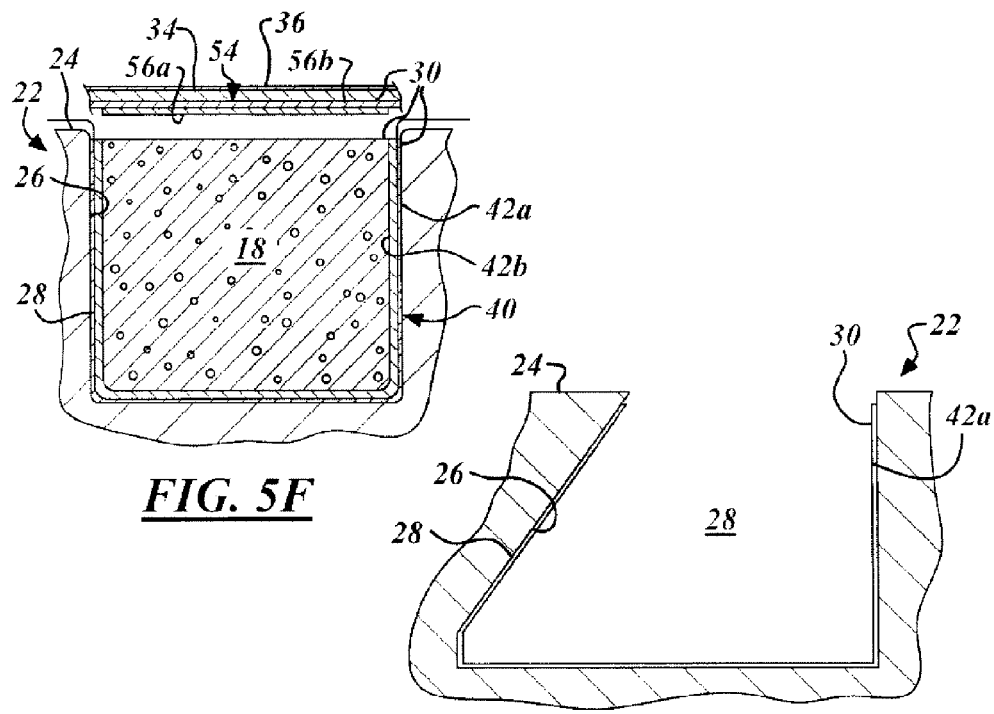
*FIG. 5F*
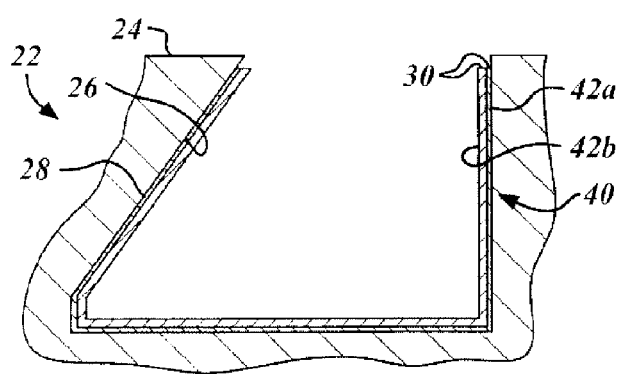
*FIG. 6A*
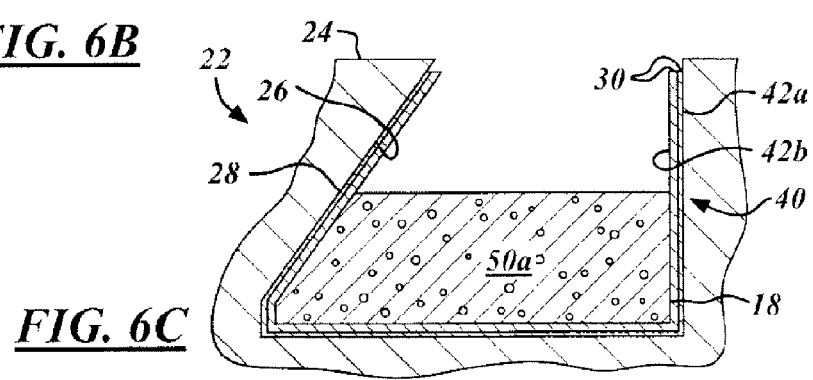
*FIG. 6B*
*FIG. 6C*

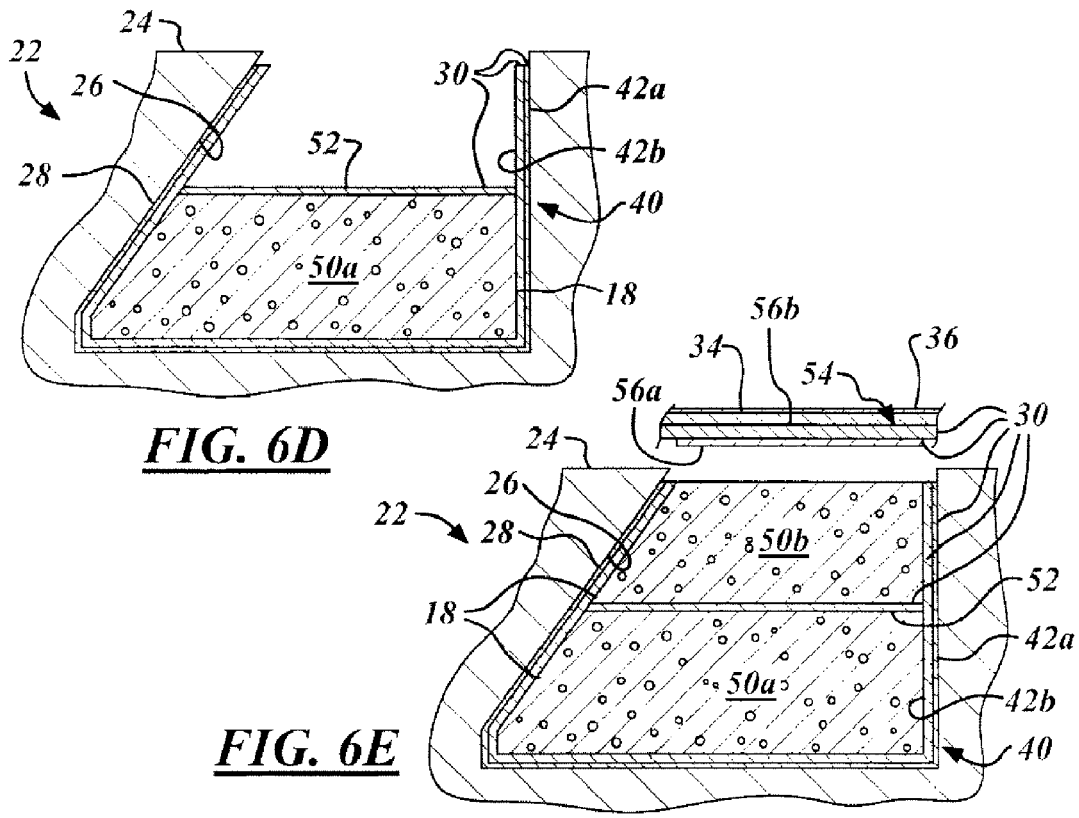
*FIG. 6D*
*FIG. 6E*
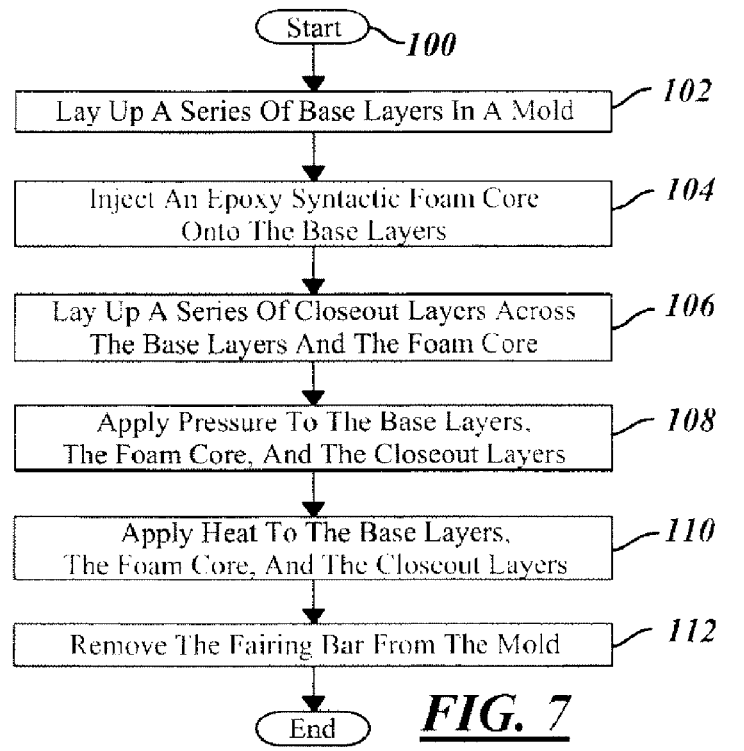
*FIG. 7*

METHOD FOR MANUFACTURING LIGHTWEIGHT COMPOSITE FAIRING BAR

RELATED APPLICATIONS

This application is a divisional application of, and claims priority from, prior application Ser. No. 11/160,192, filed Jun. 13, 2005 now issued as U.S. Pat. No. 7,416,401 on Aug. 26, 2008.

FIELD OF THE INVENTION

The present invention relates generally to composite structures, and more particularly to a lightweight composite fairing bar for manufacturing composite components.

BACKGROUND DESCRIPTION

Composite components can play an important role in the aerospace industry and manufacturing communities. With specific regard to the aerospace industry, composite components such as nacelles can provide significant strength and beneficial stiffness-to-density ratios, and hence improve the performance of an aircraft.

A typical composite component is fabricated from an uncured laminate with the assistance of fairing bars. In particular, the periphery of the laminate typically is surrounded by a series of fairing bars with a vacuum bag encapsulating the laminate and the bars. This assembly can receive a negative pressure for extracting excess resin from the laminate. The fairing bars typically are utilized for preventing the vacuum bag from breaking over voids or gaps along the edges of the laminate. Also, the fairing bars typically provide lateral support to the laminate and prevent the side portions of the laminate and its internal structures from being crushed in a chain reaction as negative pressure is applied.

Existing fairing bars are comprised of solid metal or solid laminate material. In this way, the fairing bars can be relatively heavy and may require a somewhat lengthy flow time.

It would, therefore, be highly desirable to provide a lightweight composite fairing bar having a short flow time and decreased costs in connection therewith.

SUMMARY OF THE INVENTION

An embodiment of the invention is a lightweight composite fairing bar for use in fabricating composite components of an aircraft, such as nacelles. The fairing bar includes a lightweight core and an outer shell surrounding the core. The outer shell is comprised of a laminate material, and the core is comprised of an epoxy syntactic foam having a substantially lower density than the laminate material. The outer shell is configured for supporting the composite component during fabrication of the same.

One advantage of the embodiments of the claimed invention is that a lightweight composite fairing bar is provided that has a substantially short flow time and low fabrication costs associated therewith.

Another advantage of one of the embodiments of the claimed invention is that a lightweight composite fairing bar is provided that withstands the repeated applications of substantially high temperatures and pressures, and therefore can be repeatedly utilized to produce a significant volume of composite components.

Yet another advantage of the embodiments of the claimed invention is that a lightweight composite fairing bar is provided that is sufficiently strong and lightweight for having a generally large construction.

Still another advantage of one of the embodiments of the claimed invention is that a lightweight composite fairing bar is provided that facilitates the set up and operation of a system for manufacturing composite aircraft components and decreases the costs associated therewith.

The features, functions, and advantages can be achieved independently and in various embodiments of the present invention or may be combined in yet other embodiments.

BRIEF DESCRIPTION OF THE DRAWINGS

For a more complete understanding of this invention, reference should now be made to the embodiments illustrated in greater detail in the accompanying drawings and described below by way of examples of the invention:

FIGS. 5A through 5F are enlarged cross-sectional views of the system shown in FIG. 4, sequentially illustrating the process for manufacturing the fairing bar exemplified in FIG. 2, according to still another advantageous embodiment of the claimed invention.

FIGS. 6A through 6E are enlarged cross-sectional views of the system shown in FIG. 4, sequentially illustrating the process for manufacturing the fairing bar exemplified in FIG. 3, according to yet another advantageous embodiment of the claimed invention.

FIG. 7 is a logic flow diagram of a method of operating the system shown in FIG. 4 for manufacturing the lightweight composite fairing bar exemplified in FIG. 1, according to still another advantageous embodiment of the claimed invention.

DETAILED DESCRIPTION OF THE INVENTION

Figure 1:
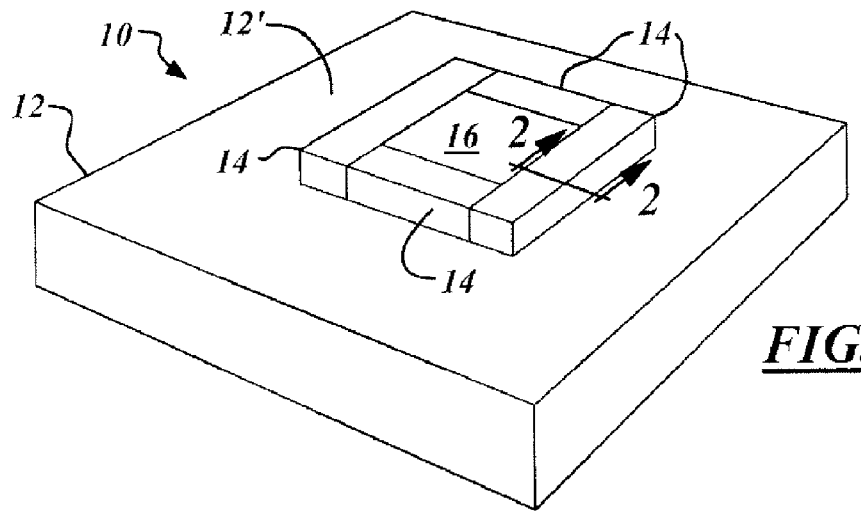
FIG. 1 is schematic perspective view of a system having a series of lightweight composite fairing bars for fabricating a composite component of an aircraft, according to one advantageous embodiment of the claimed invention.

In the following figures, the same reference numerals are used to identify the same or similar components in the various representative views.

The present invention is particularly suited for a lightweight composite fairing bar for use in a system and method for fabricating composite components of an aircraft, e.g. nacelles. In this regard, the embodiments described herein employ features where the context permits, e.g. when a specific result or advantage of the claimed invention is desired. However, it is contemplated that the fairing bar can instead be utilized for various other manufacturing processes for other airframe components or other suitable composite structures as desired. To that end, a variety of other embodiments are contemplated having different combinations of the described features, having features other than those described herein, or even lacking one or more of those features.

Referring to FIG. 1, there is shown a schematic perspective view of a system 10 for manufacturing a composite component 16 of an aircraft. The system 10 includes a bonding tool 12 with a support surface 12' and one or more fairing bars 14 mounted thereon. The fairing bars 14 are positioned on the bonding tool 12 for surrounding the final periphery of the composite component 16 and providing lateral support to the component 16 during consolidation of the same. In this way, the fairing bar 14 prevents the sides and the inner vertical support structures of the composite component 16 from being crushed in a chain reaction as the pressure is applied to the composite component 16.

As detailed below, the fairing bar 14 is comprised of a substantially strong lightweight composite. This feature is beneficial for facilitating the manufacture of the composite components 16 at least to the extent of decreasing labor and costs associated with setting up the system 10.

In addition, the strong lightweight composite is beneficial for providing a fairing bar 14 with a substantially large unitary construction. In this way, the system 10 utilizes a generally low number of non-segmented fairing bars 14 to manufacture each composite component 16. Also, the large unitary construction decreases the tracking and inventory responsibilities of commercial entities, e.g. suppliers, handling the fairing bars 14. For these additional reasons, the fairing bars 14 further minimize the labor and costs associated with manufacturing the composite components 16.

Figure 2:
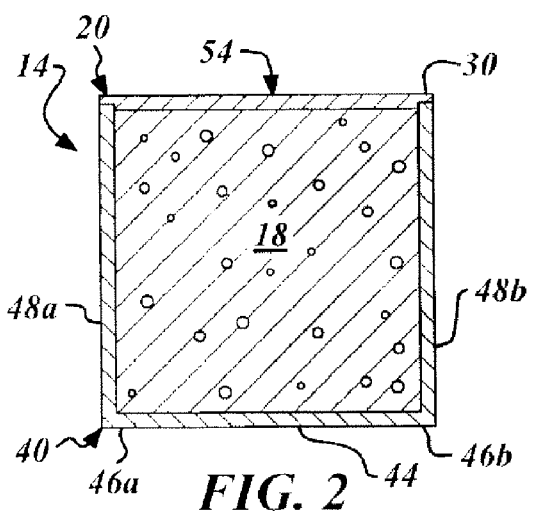
FIG. 2 is a cross-sectional view of the lightweight composite fairing bar shown in FIG. 1, as taken along line 2-2.

Referring now to FIG. 2, there is shown a cross-sectional view of the fairing bar 14 shown in FIG. 1, as taken along line 2-2, according to one advantageous embodiment of the claimed invention. The fairing bar 14 includes a lightweight core 18 and an outer shell 20 surrounding the lightweight core 18. As detailed below, the shell 20 is comprised of a laminate material, and the core 18 is comprised of epoxy syntactic foam that is less dense than the laminate material.

The epoxy syntactic foam is a thermosetting resin with microspheres selectively arranged therein for decreasing the density of the resin and providing a relatively high-strength lightweight material. This foam has a substantially low coefficient of thermal expansion for remaining essentially constant in size when heated to elevated temperatures, e.g. up to 400 degrees Fahrenheit. In this way, the stress within the outer shell 20 is minimized when substantial amounts of heat and pressure are repeatedly applied to the fairing bar 14 as it is used in the system 10 to fabricate a series of composite components 16.

In addition, the core 18 is one continuous integral amount of the epoxy syntactic foam. However, as exemplified in FIG. 3, it is contemplated that the core 18 can instead have a layered structure as desired.

Also, in this embodiment, the laminate material of the shell 20 is comprised of a thermosetting resin, such as an epoxy, with graphite fiber reinforcements embedded therein. In this way, the core 18 is comprised of a material that is substantially less dense than that of the outer shell 20. Moreover, in this embodiment, the core 18 comprises a substantially larger volume portion of the fairing bar 14 than the outer shell 20 so as to minimize the overall weight of the fairing bar 14. Yet another benefit of this construction is an enhanced flow time for fabricating the fairing bar 14 within a short manufacturing cycle and decreasing costs in connection therewith. It is contemplated that the core 18 and the shell 20 can be comprised of other suitable materials as desired so long as they fulfill the objects and purposes of the present invention.

Figure 3:
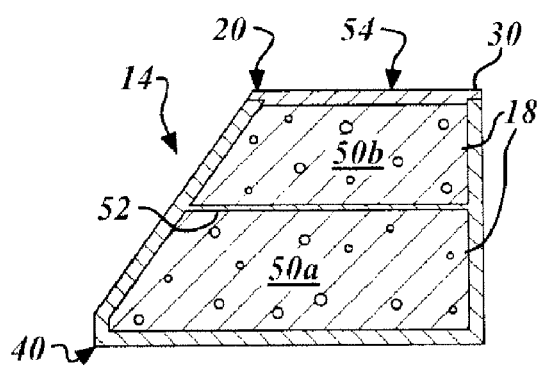
FIG. 3 is a cross-sectional view of the lightweight composite fairing bar shown in FIG. 1, as taken along line 2-2, according to another advantageous embodiment of the claimed invention.

With attention to FIGS. 2 and 3, the outer shell 20 is a substantially thin wall surrounding the core 18 for minimizing the overall weight of the fairing bar 14 and providing a relatively strong construction. For example, in one embodiment, the substantially thin wall can be comprised of generally few plies, namely less than about fourteen laminate layers.

As shown in FIG. 1, the outer shell 20 of the fairing bar 14 has an elongated structure and is configured for providing lateral support to the periphery of the composite component 16. With respect to FIG. 2, the outer shell 20 has a rectangular cross-section. However, it is contemplated that the outer shell 20 can instead have other suitable regular or irregular cross-sectional shapes. Also, as detailed in the description for FIGS. 6C through 6E, the outer shell 20 can have one or more reinforcement layers 52 attached thereto for providing additional lateral support. By way of example, in the embodiment shown in FIG. 3, the outer shell 20 is supported by one reinforcement layer 52 and has an irregular polygon shape.

Figure 4:
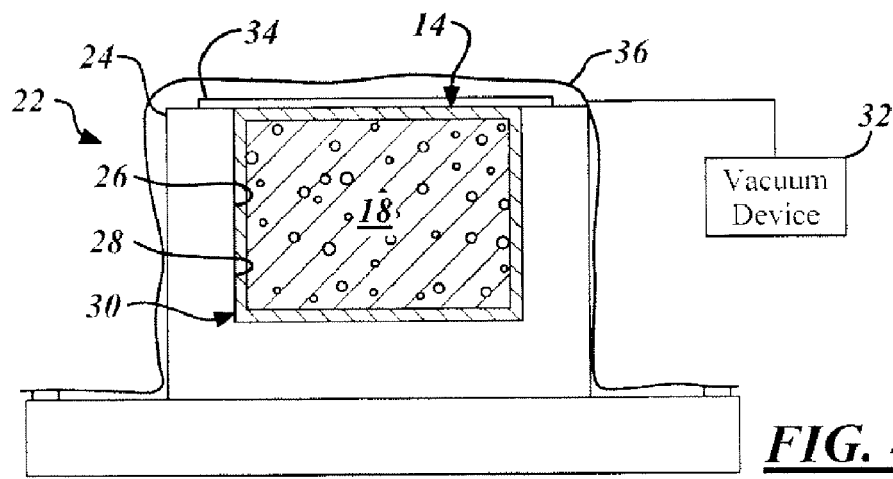
FIG. 4 is a schematic cross-sectional view of a system for manufacturing the lightweight composite fairing bar shown in FIG. 2, according to yet another advantageous embodiment of the claimed invention.

Referring now to FIG. 4, there generally is shown a system 22 for manufacturing the fairing bars 14 shown in FIGS. 2 and 3, according to another advantageous embodiment of the claimed invention.

In this embodiment, the system 22 includes a mold 24 having a surface 26 and a cavity 28 defined by the surface 26. The surface 26 is configured for forming the outer shell 18 of the fairing bar 14. Specifically, the mold 24 has a plurality of laminate layers 30 (as best shown in FIGS. 5B and 5D) laid up thereon during a lay-up process. The system 22 further includes a pressure source 32 for applying pressure to the laminate layers 30. In one embodiment, the system 22 includes a caul plate 34 for applying pressure to the uncured laminate layers 30. Also, in this embodiment, the system 22 includes a bagging film 36 for attachment to the mold 24 and sealing the layers 28 in the cavity 26. A vacuum device 32 is connected to the bagging film 36 for further consolidating the uncured layers 30.

Referring now to FIG. 7, there is shown a logic flow diagram of a method for utilizing the system 22 to manufacture the fairing bar 14. This method is described in connection with the embodiments illustrated in FIGS. 5A through 5F and FIGS. 6A through 6E.

FIGS. 5A through 5F are enlarged cross-sectional views of the system 22, sequentially illustrating the steps of operating the system 22 for manufacturing the fairing bar 14 shown in FIG. 2. Also, FIGS. 6A through 6E are enlarged cross-sectional views of the system 22, sequentially illustrating the steps of operating the system 22 for manufacturing the fairing bar 14 shown in FIG. 3.

The method commences in step 100 and then immediately proceeds to step 102.

In step 102, a series of base layers 40 for forming a portion of the shell 20 is laid on the surface 26 of the mold 24 within a cavity 28 of that mold 24. The base layers 40 preferably comprise less than twenty layers. However, it is understood that more layers 40 can be utilized as desired.

This step is accomplished by laying a first group 42a of layers (best shown in FIG. 5B) on the surface 26 of the mold 24 and then laying a second group 42b of thicker layers (shown in FIG. 5D) on the first group 42a of layers. The first group 42a of layers defines an outer surface of the fairing bar 14 while the second group 42b of layers is coupled to the core 18. The layers 42a, 42b are debulked under moderate heat and vacuum as needed to form the layers 42a, 42b against the mold 24, remove wrinkles, promote adhesion, and remove air and volatiles from between the layers 42a, 42b. Also, in this embodiment, each individual layer in the first group 42a is thinner than each layer in the second group 42b.

Moreover, as shown in FIGS. 5C and 5E, the base layers 40 are formed on the mold 24 for receiving the epoxy syntactic foam. For instance, with specific attention to FIG. 5C, the base layers 40 have a U-shaped cross-section comprised of a substantially horizontal portion 44 with opposing ends 46a, 46b and a pair of substantially vertical portions 48a, 48b extending from those ends 46a, 46b. However, it is contemplated this step can be accomplished by various other suitable methods. The sequence then proceeds to step 104.

In step 104, epoxy syntactic foam is injected into at least half of the cavity 28 for forming the core 18. Referring to FIG. 5E, this step is accomplished by filling a substantial portion of the entire cavity 28 with a continuous integral amount of the epoxy syntactic foam. For example, the epoxy syntactic foam is filled up to about 0.20 inches from a final top outer surface of the fairing bar 14. However, it is understood that the core 18 can have various other constructions as desired.

For instance, as shown in FIGS. 6C through 6E, this step can be accomplished by forming the core 18 with a layered structure. Specifically, two or more foam layers 50a, 50b are injected into the cavity 28 with one or more reinforcement layers 52 therebetween. This reinforcement layer 52 is thinner than the outer shell 20 and is utilized for strengthening the outer shell 20 and the core 18. Preferably, the fairing bar 14 has one or more of these reinforcement layers 52 when the fairing bar 14 is sized greater than 2.5 inches in height.

Also, in this embodiment, the reinforcement layer 52 is comprised of generally few laminate layers, e.g. less than ten laminate layers. Preferably, each reinforcement layer 52 is comprised of four laminate layers. In addition, although FIG. 3 illustrates the reinforcement layer 52 integrated within a fairing bar 14 that has an irregular polygon cross-section, it is understood that the reinforcement layers 52 can instead be integrated within fairing bars having a variety of other cross-sectional shapes. By way of example, the fairing bar 14 can have a regular rectangular cross-section with one or more reinforcement layers 52 therein. Furthermore, it will be appreciated that the core 18 can have a variety of other layered or non-layered structures and be formed by various other suitable methods as desired. The sequence then proceeds to step 106.

In step 106, a series of closeout layers 54 is laid across the core 18 and the base layers 40. In the embodiment shown in FIG. 5F, the closeout layers 54 include a series of leveling layers 56a and a series of finishing layers 56b. The leveling layers 56a are laid across the core 18 and extend between the top ends of the base layers 40. Thereafter, in this embodiment, the finishing layers 56b are laid across the leveling layers 56a and the top ends of the base layers 40 until three finishing layers 56b are stacked above the final top outer surface of the fairing bar 14 after consolidation. In this way, a sufficient number of finishing layers 56b can be stacked thereon for producing a substantially flat top surface. It is understood that the closeout layers 54 can be applied by various other suitable methods. The sequence then proceeds to step 108.

In step 108, a predetermined amount of pressure is applied to the lay-up. This step is accomplished by an autoclave machine, bag molding, a caul plate, various other suitable pressure devices, or any combination thereof. Then, the sequence proceeds to step 110.

In step 110, a predetermined amount of heat, e.g. up to 400 degrees Fahrenheit, is applied to the lay-up for a predetermined time during a cure process. It is understood that steps 108 and 110 can be accomplished simultaneously as desired. Thereafter, the sequence proceeds to step 112.

In step 112, the fairing bar 14 is removed from the mold 24.

While particular embodiments of the invention have been shown and described, numerous variations and alternate embodiments will occur to those skilled in the art. Accordingly, it is intended that the invention be limited only in terms of the appended claims.

What is claimed is:

1. A method for manufacturing a lightweight composite fairing bar including a lightweight core and outer shell comprised of a laminate material, comprising:
    laying up a plurality of base layers on a surface of a mold so as to form said outer shell;
    placing epoxy syntactic foam having a substantially low coefficient of thermal expansion on said base layers to form said core;
    laying up a plurality of closeout layers on said plurality of base layers and said epoxy syntactic foam for forming a composite lay-up; and
    minimizing stress within said outer shell when substantial amounts of heat and pressure are repeatedly applied to the fairing bar by applying heat and pressure to said composite lay-up such that said epoxy syntactic foam remains substantially constant in size when heated to elevated temperatures.

2. The method as recited in claim 1 wherein laying up said plurality of base layers comprises laying up less than about fourteen laminate layers on said surface of said mold.

3. The method as recited in claim 1 wherein laying up said plurality of base layers comprises:
    laying up a first group of layers on said surface of said mold; and
    laying up a second group of layers on said first group of layers, said first group of layers having an individual ply thickness that is less than that of said second group of layers.

4. The method as recited in claim 3 wherein laying up said plurality of closeout layers comprises laying up a sufficient number of laminate layers for stacking three laminate layers above a final top outer surface of the lightweight composite fairing bar.

5. The method as recited in claim 1 further comprising:
    forming a core with a layered structure comprised of at least two epoxy syntactic foam layers and at least one reinforcement layer therebetween.

6. The method as recited in claim 1 wherein laying up said plurality of closeout layers comprises:
    laying up a plurality of leveling layers on said epoxy syntactic foam between a pair of opposing sides of said plurality of base layers; and
    laying up a plurality of finishing layers on said pair of opposing sides of said base layers and said plurality of leveling layers.

7. The method as recited in claim 1 wherein said epoxy syntactic foam remains substantially constant in size when heated up to 400 degrees Fahrenheit.

8. The method as recited in claim 1 wherein the mold surface comprises a cavity configured for fabricating the lightweight composite fairing bar.

9. The method as recited in claim 8 wherein at least half of the cavity is filled with said epoxy syntactic foam having a substantially low coefficient of thermal expansion.

10. The method as recited in claim 8 wherein a substantial portion of the cavity is filled with said epoxy foam having a substantially low coefficient of thermal expansion.

11. The method as recited in claim 1 wherein the epoxy syntactic foam core comprises a substantially larger volume portion of the lightweight fairing bar.

12. The method of claim 1 wherein the base layers laid up are of a thickness sufficient to form a substantially thin wall surrounding the core.

13. The method of claim 3 wherein the syntactic foam is placed on the second group of layers.

14. The method of claim 5 wherein the core with a layered structure is formed by creating layers of epoxy syntactic foam separated by reinforcement layers that are thinner than the base layers.

15. The method of claim 14 wherein the reinforcement layers comprise less than ten laminate layers.

16. A method for manufacturing a lightweight composite fairing bar including a lightweight core and an outer shell comprised of a laminate material comprising:
providing a mold with a surface having a cavity configured in the shape of the fairing bar;
laying up a plurality of base layers on the surface of the mold to form said outer shell;
placing epoxy syntactic foam having a substantially low coefficient of thermal expansion inside the cavity, said plurality of base layers disposed between the epoxy syntactic foam and the walls of the cavity;
laying up a plurality of closeout layers on said plurality of base layers and said epoxy syntactic foam such that the epoxy syntactic foam is contained between the base layers and the closeout layers to form a complete lay-up;
minimizing stress within said outer shell when substantial amounts of heat and pressure are repeatedly applied to the fairing bar by applying heat and pressure to the lay-up such that said epoxy syntactic foam remains substantially constant in size when heated to elevated temperatures.

17. The method as recited in claim 16 wherein one or more layers of foam separated by reinforcement layers is placed inside the cavity.

18. The method as recited in claim 16 wherein multiple groups of one or more base layers are laid on each side of the cavity wherein each group has an individual ply thickness that varies from the individual ply thickness of the other groups laid on the same side of the cavity.

19. A method for manufacturing a lightweight fairing bar including a lightweight core and a outer shell comprised of a laminate material comprising:
providing a mold with a cavity in the shape of the fairing bar;
laying up a first plurality of laminate layers on a surface of the mold;
laying up a second plurality of laminate layers onto the first plurality of laminate layers so as to form said outer shell, the second plurality of laminate layers being thicker than the first plurality of laminate layers;
placing an amount of an epoxy syntactic foam having a substantially low coefficient of thermal expansion in the cavity to fill at least half of the cavity and form said core;
laying a plurality of leveling layers on the epoxy syntactic foam, the leveling layers extending between laminate layers on different sides of the cavity;
laying up a plurality of finishing layers on top of the leveling layers to form a complete layup;
minimizing stress within the outer shell when substantial amounts of heat and pressure are repeatedly applied to the fairing bar by applying pressure to the complete lay-up and applying heat to the complete lay-up such that said epoxy syntactic foam remains substantially constant in size when heated to elevated temperatures.

20. The method as claimed in claim 19 wherein said epoxy syntactic foam has microspheres selectively arranged therein for decreasing the density of said epoxy syntactic foam.

21. The method as claimed in claim 19 wherein said epoxy syntactic foam has graphite fibers embedded therein for decreasing the density of said epoxy syntactic foam.

* * * * *